United States Patent
Song et al.

(10) Patent No.: US 8,137,585 B2
(45) Date of Patent: Mar. 20, 2012

(54) PHOSPHOR COMPOSITION AND DISPLAY DEVICE INCLUDING THE SAME

(75) Inventors: Jay-Hyok Song, Suwon-si (KR); Yu-Mi Song, Suwon-si (KR); Yoon-Chang Kim, Suwon-si (KR); Do-Hyung Park, Suwon-si (KR); Yong-Chan You, Suwon-si (KR); Gyeong-Jae Heo, Suwon-si (KR); Ick-Kyu Choi, Suwon-si (KR); Mi-Ran Song, Suwon-si (KR); Seon-Young Kwon, Suwon-si (KR); Hyun-Deok Lee, Suwon-si (KR); Ji-Hyun Kim, Suwon-si (KR); Jin-Hyoung Seo, Suwon-si (KR); Sun-Hwa Kwon, Suwon-si (KR); Min-Ju Kim, Suwon-si (KR); Young-Hun Lee, Suwon-si (KR); Young-Ki Kim, Suwon-si (KR)

(73) Assignee: Samsung SDI Co., Ltd., Suwon-si, Gyeonggi-do (KR)

(*) Notice: Subject to any disclaimer, the term of this patent is extended or adjusted under 35 U.S.C. 154(b) by 494 days.

(21) Appl. No.: 12/320,765

(22) Filed: Feb. 4, 2009

(65) Prior Publication Data

US 2009/0195143 A1 Aug. 6, 2009

(30) Foreign Application Priority Data

Feb. 5, 2008 (KR) ......................... 10-2008-0011746

(51) Int. Cl.
*C09K 11/80* (2006.01)

(52) U.S. Cl. ............... 252/301.4 R; 313/486; 313/487; 252/301.6 F; 252/301.6 R

(58) Field of Classification Search ........... 252/301.4 R, 252/301.6 R, 301.6 F; 313/486, 487
See application file for complete search history.

(56) References Cited

U.S. PATENT DOCUMENTS

| | | | | |
|---|---|---|---|---|
| 3,657,140 A * | 4/1972 | Gibbons | ............... | 252/301.4 R |
| 4,314,910 A * | 2/1982 | Barnes | ............... | 252/301.4 R |
| 6,066,861 A | 5/2000 | Höhn et al. | | |
| 2003/0155856 A1* | 8/2003 | Shiiki et al. | ............... | 313/483 |
| 2006/0152135 A1 | 7/2006 | Choi et al. | | |
| 2009/0008663 A1* | 1/2009 | Shimizu et al. | ............... | 257/98 |

FOREIGN PATENT DOCUMENTS

EP 1 681 336 A1 7/2006
WO WO 2006/093015 * 9/2006

OTHER PUBLICATIONS

Jia et al, "Pechini sol-gel deposition and luminescnet propeties of Y3AI5-xGaxO12:Ln3+ (Ln3+=Eu3+, Ce3+, Tb3+; 0<x<) thin films", Thin Solid Films 483 (2005), pp. 122-129.*
Derwent abstract 2008-L87165 for CN 101134896, Mar. 2008.*

(Continued)

*Primary Examiner* — Carol M Koslow
(74) *Attorney, Agent, or Firm* — Lee & Morse, P.C.

(57) ABSTRACT

The phosphor composition including a first phosphor represented by Formula 1:

$$Y_{3-x-k}Ce_kM'_xAl_{a-y}M''_yO_{(1.5a+4.5)} \quad (1).$$

In Formula 1, M' includes at least one of Sc, In, and La, M'' includes at least one of Ga, Sc, and In, and x, y, k, and a satisfy the relations: $0.0 \leq x < 3.0$, $0.0 < y \leq 7.0$, $0.0 < k < 0.1$, $4.0 \leq a \leq 7.0$, $a-y \geq 0.0$, and $x+k \leq 3.0$.

19 Claims, 8 Drawing Sheets

Table 1: Composition, Color coordinate, and Decay time.

| | Phosphor composition | CIE x | CIE y | Decay time (ms) |
|---|---|---|---|---|
| Example 1 | $Y_{2.97}Ce_{0.03}Al_{4.5}Ga_{0.5}O_{12}$ (x=0, y=0.5, k=0.03, a=5) | 0.3661 | 0.5586 | < 1.0 |
| Example 2 | $Y_{2.97}Ce_{0.03}Al_{4.0}Ga_{1.0}O_{12}$ (x=0, y=1.0, k=0.03, a=5) | 0.3431 | 0.5570 | < 1.0 |
| Example 3 | $Y_{2.97}Ce_{0.03}Al_{3.5}Ga_{1.5}O_{12}$ (x=0, y=1.5, k=0.03, a=5) | 0.3160 | 0.5464 | < 1.0 |
| Example 4 | $Y_{2.97}Ce_{0.03}Al_{3.0}Ga_{2.0}O_{12}$ (x=0, y=2.0, k=0.03, a=5) | 0.2941 | 0.5328 | < 1.0 |
| Example 5 | $Y_{2.97}Ce_{0.03}Al_{2.5}Ga_{2.5}O_{12}$ (x=0, y=2.5, k=0.03, a=5) | 0.2792 | 0.5211 | < 1.0 |
| Comparative Example 1 | $Zn_{1.8}Mn_{0.2}SiO_4$ | 0.2617 | 0.6921 | 5.5 ± 0.2 |
| Comparative Example 2 | $(Y_{0.5}Gd_{0.5})_{0.75}Tb_{0.25}Al_3(BO_3)_4$ | 0.3383 | 0.5844 | 5.0 ± 0.2 |
| Comparative Example 3 | $Y_{2.97}Ce_{0.03}Al_5O_{12}$ (x=0, y=0, k=0.03, a=5) | 0.4127 | 0.5521 | < 1.0 |

OTHER PUBLICATIONS

Hamada, K., et al., "A 3D Hi-Vision Display with 50-in. AC PDP", Asia Display / IDW'01, pp. 785-788 (Jan. 1, 2001) [XP007015400].

Jia, P.Y., et al., "Pechini sol-gel deposition and luminescence properties of $Y_3Al_{5-x}Ga_xO_{12}:Ln^{3+}$ ($Ln^{3+}=Eu^{3+}$, $Ce^{3+}$, $Tb^{3+}$; $0 \leq x \leq 5$) thin films", Thin Solid Films, 483(1-2):122-129 (Jul. 1, 2005) [XP004906507].

Vorobiev, V, et al., "Studying of $Y_3Al_5\text{-}xScxO_{12}$:Ce photoluminescence", The Institution of Electrical Engineers, Stevenage, GB, (2007) [XP002569873].

Wu, Jennifer L., "Spectral Properties of Various Cerium Doped Garnet Phosphors for Application in in White GaN-based LEDs", Mat. Res. Soc. Symp. Proc., vol. 658, pp. GG11.8.1-GG11.8.6 (2001) [XP009036120].

European Office Action in EPP101804, dated Feb. 18, 2011, (Song, et al.).

Chinese Office Action dated Oct. 26, 2011.

* cited by examiner

FIG. 3

Table 1: Composition, Color coordinate, and Decay time.

| | Phosphor composition | CIE x | CIE y | Decay time (ms) |
|---|---|---|---|---|
| Example 1 | $Y_{2.97}Ce_{0.03}Al_{4.5}Ga_{0.5}O_{12}$ (x=0, y=0.5, k=0.03, a=5) | 0.3661 | 0.5586 | < 1.0 |
| Example 2 | $Y_{2.97}Ce_{0.03}Al_{4.0}Ga_{1.0}O_{12}$ (x=0, y=1.0, k=0.03, a=5) | 0.3431 | 0.5570 | < 1.0 |
| Example 3 | $Y_{2.97}Ce_{0.03}Al_{3.5}Ga_{1.5}O_{12}$ (x=0, y=1.5, k=0.03, a=5) | 0.3160 | 0.5464 | < 1.0 |
| Example 4 | $Y_{2.97}Ce_{0.03}Al_{3.0}Ga_{2.0}O_{12}$ (x=0, y=2.0, k=0.03, a=5) | 0.2941 | 0.5328 | < 1.0 |
| Example 5 | $Y_{2.97}Ce_{0.03}Al_{2.5}Ga_{2.5}O_{12}$ (x=0, y=2.5, k=0.03, a=5) | 0.2792 | 0.5211 | < 1.0 |
| Comparative Example 1 | $Zn_{1.8}Mn_{0.2}SiO_4$ | 0.2617 | 0.6921 | 5.5 ± 0.2 |
| Comparative Example 2 | $(Y_{0.5}Gd_{0.5})_{0.75}Tb_{0.25}Al_3(BO_3)_4$ | 0.3383 | 0.5844 | 5.0 ± 0.2 |
| Comparative Example 3 | $Y_{2.97}Ce_{0.03}Al_5O_{12}$ (x=0, y=0, k=0.03, a=5) | 0.4127 | 0.5521 | < 1.0 |

FIG. 4

Table 2: Composition, Color coordinate, and Relative luminance.

| | Phosphor composition | CIE x | CIE y | Relative luminance (%) |
|---|---|---|---|---|
| Example 1 | $Y_{2.97}Ce_{0.03}Al_{4.5}Ga_{0.5}O_{12}$ (x=0, y=0.5, k=0.03, a=5) | 0.3661 | 0.5586 | 70.6 |
| Example 2 | $Y_{2.97}Ce_{0.03}Al_{4.0}Ga_{1.0}O_{12}$ (x=0, y=1.0, k=0.03, a=5) | 0.3431 | 0.5570 | 76.4 |
| Example 3 | $Y_{2.97}Ce_{0.03}Al_{3.5}Ga_{1.5}O_{12}$ (x=0, y=1.5, k=0.03, a=5) | 0.3160 | 0.5464 | 91.9 |
| Example 4 | $Y_{2.97}Ce_{0.03}Al_{3.0}Ga_{2.0}O_{12}$ (x=0, y=2.0, k=0.03, a=5) | 0.2941 | 0.5328 | 96.4 |
| Example 5 | $Y_{2.97}Ce_{0.03}Al_{2.5}Ga_{2.5}O_{12}$ (x=0, y=2.5, k=0.03, a=5) | 0.2792 | 0.5211 | 93.2 |
| Comparative Example 3 | $Y_{2.97}Ce_{0.03}Al_{5}O_{12}$ (x=0, y=0, k=0.03, a=5) | 0.4127 | 0.5521 | 100.0 |

FIG. 5

Table 3: Composition, Color coordinate, Decay time, and Relative luminance.

| | Phosphor composition | CIE x | CIE y | Decay time (ms) | Relative luminance (%) |
|---|---|---|---|---|---|
| Example 5 | $Y_{2.97}Ce_{0.03}Al_{2.5}Ga_{2.5}O_{12}$ (x=0, y=2.5, k=0.03, a=5) | 0.2792 | 0.5211 | < 1.0 | 93.2 |
| Example 6 | $Y_{2.98}Ce_{0.02}Al_{2.5}Ga_{2.5}O_{12}$ (x=0, y=2.5, k=0.02, a=5) | 0.2788 | 0.5208 | < 1.0 | 92.8 |
| Example 7 | $Y_{2.94}Ce_{0.06}Al_{2.5}Ga_{2.5}O_{12}$ (x=0, y=2.5, k=0.06, a=5) | 0.2863 | 0.5251 | < 1.0 | 91.5 |
| Example 8 | $Y_{2.92}Ce_{0.08}Al_{2.5}Ga_{2.5}O_{12}$ (x=0, y=2.5, k=0.08, a=5) | 0.2983 | 0.5394 | < 1.0 | 90.9 |
| Comparative Example 3 | $Y_{2.97}Ce_{0.03}Al_5O_{12}$ (x=0, y=0, k=0.03, a=5) | 0.4127 | 0.5521 | < 1.0 | 100.0 |
| Comparative Example 4 | $Y_{2.90}Ce_{0.10}Al_{2.5}Ga_{2.5}O_{12}$ (x=0, y=2.5, k=0.10, a=5) | 0.3132 | 0.5433 | < 1.0 | 83.4 |

FIG. 6

Table 4: Color coordinate, Decay time, and Relative luminance for Comparative Example 5

| Mixing weight ratio | Decay time (ms) | CIE x | CIE y | Relative luminance (%) |
|---|---|---|---|---|
| R1 : R2 = 10.0 : 0.0 | < 1.0 | 0.4127 | 0.5521 | 100.0 |
| R1 : R2 = 7.5 : 2.5 | < 1.0 | 0.4072 | 0.5604 | 113.6 |
| R1 : R2 = 5.0 : 5.0 | 1.3 ± 0.5 | 0.3911 | 0.5684 | 126.3 |
| R1 : R2 = 2.5 : 7.5 | 2.5 ± 0.5 | 0.3632 | 0.5771 | 136.3 |
| R1 : R2 = 0.0 : 10.0 | 5.0 ± 0.5 | 0.3383 | 0.5844 | 154.6 |

FIG. 7

Table 5: Color coordinate, Decay time, and Relative luminance for Example 9.

| Mixing weight ratio | Decay time (ms) | CIE x | CIE y | Relative luminance (%) |
|---|---|---|---|---|
| R1 : R2 = 10.0 : 0.0 | < 1.0 | 0.2941 | 0.5328 | 100.0 |
| R1 : R2 = 7.5 : 2.5 | < 1.0 | 0.3101 | 0.5501 | 114.6 |
| R1 : R2 = 5.0 : 5.0 | 1.4 ± 0.5 | 0.3223 | 0.5659 | 128.7 |
| R1 : R2 = 2.5 : 7.5 | 2.8 ± 0.5 | 0.3322 | 0.5765 | 140.2 |
| R1 : R2 = 0.0 : 10.0 | 5.0 ± 0.5 | 0.3383 | 0.5844 | 160.5 |

FIG. 8

Table 6: Color coordinate, Decay time, and Relative luminance for Example 10.

| Mixing weight ratio | Decay time (ms) | CIE x | CIE y | Relative luminance (%) |
|---|---|---|---|---|
| R1 : R2 = 10.0 : 0.0 | < 1.0 | 0.2941 | 0.5328 | 100.0 |
| R1 : R2 = 7.5 : 2.5 | 2.4 ± 0.5 | 0.2786 | 0.6059 | 125.5 |
| R1 : R2 = 5.0 : 5.0 | 3.7 ± 0.5 | 0.2679 | 0.6585 | 141.3 |
| R1 : R2 = 2.5 : 7.5 | 4.9 ± 0.5 | 0.2642 | 0.6797 | 147.8 |
| R1 : R2 = 0.0 : 10.0 | 5.5 ± 0.5 | 0.2617 | 0.6921 | 150.3 |

PHOSPHOR COMPOSITION AND DISPLAY DEVICE INCLUDING THE SAME

BACKGROUND

1. Field

Embodiments relate to a phosphor composition and a display device including the same.

2. Description of the Related Art

A stereoscopic image from a plasma display panel (PDP) may be realized by dividing 1 TV field (16.7 ms) into two subfields, respectively producing left and right stereoscopic images, and then projecting the stereoscopic images to left and right eyes of a user wearing goggles. Optical shutters may be mounted on the left and right sides of the goggles to project the selected stereoscopic image signal to both eyes of the user by connecting the left subfield and the right subfield.

The phosphor layers in the PDP for a stereoscopic image should have a lower decay time than that of a general PDP, because the conventional 1 TV field is divided in half to provide two subfields. Particularly, phosphors having a decay time of more than 4.0 ms may cause a crosstalk phenomenon, e.g., acquiring a left subfield image by the right eye, thereby remarkably deteriorating the resolution and distinction of a stereoscopic image.

A decay time of 5 ms or less may be required for a three dimensional ("3D") PDP. In addition, when the PDP panel is used for a long time, a severe decrease in brightness of the green phosphor may occur relative to the red and blue phosphors. Accordingly, a green phosphor having a short decay time may be required in order to realize a stereoscopic image.

SUMMARY

Embodiments are therefore directed to a phosphor composition and a display device including the same, which substantially overcome one or more of the problems due to the limitations and disadvantages of the prior art.

It is therefore a feature of an embodiment to provide a phosphor composition for a green discharge cell having a low decay time.

It is therefore another feature of an embodiment to provide a phosphor composition having excellent color coordinate characteristics.

It is therefore another feature of an embodiment to provide a phosphor composition having excellent luminance.

At least one of the above and other features and advantages may be realized by providing a first phosphor represented by Formula 1:

$$Y_{3-x-k}Ce_kM'_xAl_{a-y}M''_yO_{(1.5a+4.5)} \quad (1)$$

wherein, M' includes at least one of Sc, In, and La, M'' includes at least one of Ga, Sc, and In, and x, y, a, and k satisfy the relations: $0.0 \leq x < 3.0$, $0.0 < y \leq 7.0$, $0.0 < k < 0.1$, $4.0 \leq a \leq 7.0$, $a-y \geq 0.0$, and $x+k \leq 3.0$.

x, y, k, and a may satisfy the relations: $0.0 \leq x \leq 1.0$, $1.0 \leq y \leq 3.0$, $0.01 < k < 0.05$, and $4.0 \leq a \leq 6.0$.

The first phosphor may have a decay time of about 5.0 ms or less.

The first phosphor may have a decay time of about 1 ms or less.

The first phosphor may have a color coordinate of CIE (x) of about 0.21 to about 0.41 and CIE (y) of about 0.50 to about 0.57.

The phosphor composition may further include a second phosphor including at least one phosphor represented by Formulae 2 to 9:

$$Zn_{2-p}Mn_pSiO_4 \quad (2)$$

wherein p satisfies the relation: $0.01 \leq p \leq 0.60$, $$YBO_3:Tb \quad (3)$$

$$(Y,Gd)_{1-q}Tb_qAl_3(BO_3)_4 \quad (4)$$

wherein q satisfies the relation: $0.01 \leq q \leq 0.50$, $$BaMgAl_{10}O_{17}:Mn \quad (5)$$

$$BaMgAl_{12}O_{19}:Mn \quad (6)$$

$$Zn(Ga_{1-r}Al_r)_2O_4:Mn \quad (7)$$

wherein r satisfies the relations: $0 \leq r \leq 1$, $$Li_2Zn(Ge,\theta)_vO_8:Mn \quad (8)$$

wherein $\theta$ includes Al or Ga, and v satisfies the relation: $3 \leq v \leq 4$, $$(Y_{3-w}Ce_w)Al_5O_{12} \quad (9)$$

wherein w satisfies the relation: $0 \leq w \leq 3$.

The first and second phosphors may be included in a weight ratio of about 75:25 to about 10:90.

The first and second phosphors may be included in a weight ratio of about 60:40 to about 20:80.

The phosphor composition may have a color coordinate of CIE (x) of about 0.21 to about 0.37 and CIE (y) of about 0.50 to about 0.68.

At least one of the above and other features and advantages may also be realized by providing a display device, including a display unit including a first phosphor represented by Formula 1:

$$Y_{3-x-k}Ce_kM'_xAl_{a-y}M''_yO_{(1.5a+4.5)} \quad (1)$$

wherein, M' includes at least one of Sc, In, and La, M'' includes at least one of Ga, Sc, and In, and x, y, k, and a satisfy the relations: $0.0 \leq x < 3.0$, $0.0 < y \leq 7.0$, $0.0 < k < 0.1$, $4.0 \leq a \leq 7.0$, $a-y \geq 0.0$, and $x+k \leq 3.0$.

x, y, k, and a may satisfy the relations: $0.0 \leq x \leq 1.0$, $1.0 \leq y \leq 3.0$, $0.01 < k < 0.05$, and $4.0 \leq a \leq 6.0$.

The first phosphor may have a decay time of about 5.0 ms or less.

The first phosphor may have a decay time of about 1 ms or less.

The first phosphor may have a color coordinate of CIE (x) of about 0.21 to about 0.41 and CIE (y) of about 0.50 to about 0.57.

The phosphor composition may further include a second phosphor including at least one phosphor represented by Formulae 2 to 9:

$$Zn_{2-p}Mn_pSiO_4 \quad (2)$$

wherein p satisfies the relation: $0.01 \leq p \leq 0.60$, $$YBO_3:Tb \quad (3)$$

$$(Y,Gd)_{1-q}Tb_qAl_3(BO_3)_4 \quad (4)$$

wherein q satisfies the relation: $0.01 \leq q \leq 0.50$, $$BaMgAl_{10}O_{17}:Mn \quad (5)$$

$$BaMgAl_{12}O_{19}:Mn \quad (6)$$

$$Zn(Ga_{1-r}Al_r)_2O_4:Mn \quad (7)$$

wherein r satisfies the relations: $0 \leq r \leq 1$, $$Li_2Zn(Ge,\theta)_v O_8:Mn \qquad (8)$$

wherein θ includes Al or Ga, and v satisfies the relation: $3 \leq v \leq 4$, $$(Y_{3-w}Ce_w)Al_5O_{12} \qquad (9)$$

wherein w satisfies the relation: $0 \leq w \leq 3$.

The first and second phosphors may be included in a weight ratio of about 75:25 to about 10:90.

The first and second phosphors may be included in a weight ratio of about 60:40 to about 20:80.

The phosphor composition may have a color coordinate of CIE (x) of about 0.21 to about 0.37 and CIE (y) of about 0.50 to about 0.68.

The display device may include a device for realizing a three-dimensional stereoscopic image.

The display device may be driven at a rate of about 60 Hz or more.

BRIEF DESCRIPTION OF THE DRAWINGS

The above and other features and advantages will become more apparent to those of ordinary skill in the art by describing in detail exemplary embodiments thereof with reference to the attached drawings, in which:

FIG. 3 illustrates Table 1, showing compositions, color coordinate, and decay times for Examples 1 to 5 and Comparative Examples 1 to 3;

FIG. 4 illustrates Table 2, showing compositions, color coordinate, and relative luminance for Examples 1 to 5 and Comparative Example 3;

FIG. 5 illustrates Table 3, showing compositions, color coordinate, decay time, and relative luminance for Examples 5 to 8 and Comparative Examples 3 and 4;

FIG. 6 illustrates Table 4, showing decay time, color coordinate, and relative luminance for Comparative Example 5;

FIG. 7 illustrates Table 5, showing decay time, color coordinate, and relative luminance for Example 9; and FIG. 8 illustrates Table 6, showing decay time, color coordinate, and relative luminance for Example 10.

DETAILED DESCRIPTION OF THE INVENTION

Figure 1:
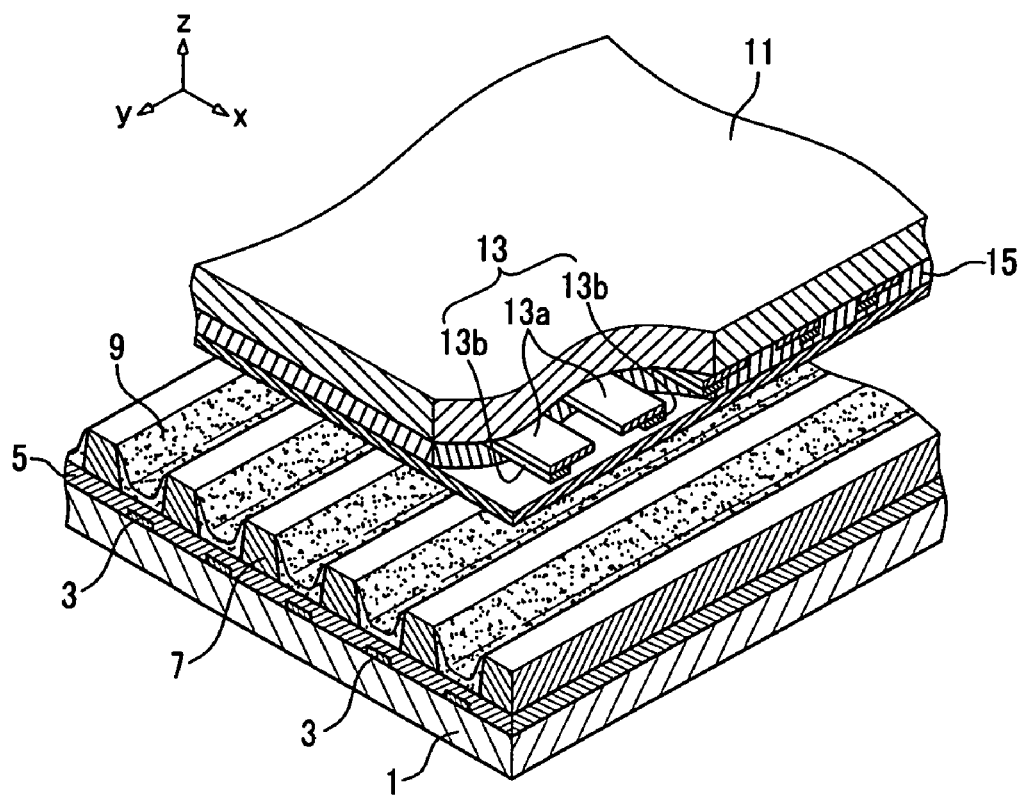
FIG. 1 illustrates a partial exploded perspective view of a plasma display panel according to an embodiment.

Korean Patent Application No. 10-2008-0011746, filed on Feb. 5, 2008, in the Korean Intellectual Property Office, and entitled: "Phosphor Composition For Display Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a flux" may represent a single compound, e.g., $BaF_2$, or multiple compounds in combination, e.g., $BaF_2$ mixed with $B_2O_3$.

As used herein, the term "decay time" means the time for decreasing optical volume expressed from a phosphor to 1/10 of the initial optical volume.

Embodiments relate to a phosphor composition for, e.g., a display device, and particularly for a display device that is capable of realizing a 3D stereoscopic image. Specifically, embodiments relate to a green phosphor composition with a shorter decay time than red and blue phosphors, because green has high luminescence and a wavelength that is easily acquired by the naked eye. The display device may include any suitable display device, e.g., a PDP. According to another embodiment, the phosphor composition may be used in a plasma display device having an excitation source of vacuum ultraviolet (VUV) rays.

According to an embodiment, a phosphor composition may include a first phosphor represented by Formula 1:

$$Y_{3-x-k}Ce_k M'_x Al_{a-y} M''_y O_{(1.5a+4.5)} \qquad (1).$$

In Formula 1, M' may include at least one of Sc, In, and La. Preferably, M' includes La.

M" may include at least one of Ga, Sc, and In. Preferably, M" includes Ga.

x, y, k, and a represent molar ratios of corresponding elements. They may satisfy the relations: $0.0 \leq x < 3.0$, $0.0 < y \leq 7.0$, $0.0 < k < 0.1$, $4.0 \leq a \leq 7.0$, $a-y \geq 0.0$, and $x+k \leq 3.0$. Preferably, x, y, k, and a satisfy the relations: $0.0 \leq x \leq 1.0$, $1.0 \leq y \leq 3.0$, $0.01 < k < 0.05$, and $4.0 \leq a \leq 6.0$.

According to an embodiment, a phosphor may be prepared by adding M", e.g., Ga, and the like, to a conventional $(Y_{3-q}Ce_q)Al_5O_{12}$ phosphor, as well as partially substituting M' for Al. This may result in a phosphor composition having a decreased decay time and improved color purity characteristic.

According to another embodiment, a phosphor composition may include a first phosphor represented by Formula 1 and a second phosphor including at least one phosphor represented by Formulae 2 to 9:

$$Zn_{2-p}Mn_pSiO_4 \quad (2)$$

wherein p may satisfy the relation: $0.01 \leqq p \leqq 0.60$, $$YBO_3:Tb \quad (3)$$

$$(Y,Gd)_{1-q}Tb_qAl_3(BO_3)_4 \quad (4)$$

wherein q may satisfy the relation: $0.01 \leqq q \leqq 0.50$, $$BaMgAl_{10}O_{17}:Mn \quad (5)$$

$$BaMgAl_{12}O_{19}:Mn \quad (6)$$

$$Zn(Ga_{1-r}Al_r)_2O_4:Mn \quad (7)$$

wherein r may satisfy the relation: $0 \leqq r \leqq 1$, $$Li_2Zn(Ge,\theta)_vO_8:Mn \quad (8)$$

wherein θ may include Al or Ga, and v may satisfy the relation: $3 \leqq v \leqq 4$.

$$(Y_{3-w}Ce_w)Al_5O_{12} \quad (9)$$

wherein w may satisfy the relation: $0 \leqq w \leqq 3$.

In addition, the second phosphor may include any suitable green phosphors, other than phosphors represented by Formulae 2 to 9, as long as they can maintain luminescence and improve the green color coordinate characteristics. The other green phosphors may be used together with phosphors represented by Formulae 2 to 9.

According to an embodiment, the first and second phosphors may be included in a weight ratio of about 75:25 to about 10:90. Preferably, the first and the second phosphors are included in a weight ratio of about 60:40 to about 20:80. Providing the first and second phosphors in a weight ratio of about 75:25 to about 10:90 may help improve the green color coordinate characteristics while maintaining luminescence, thereby improving color quality.

According to an embodiment, a phosphor composition may have an excellent color coordinate characteristic without a decrease of luminescence, as well as a short decay time, so that the phosphor composition may be used in a display device, e.g., a PDP. Particularly, the phosphor composition may be used in a display device that is capable of being driven at a high speed of, e.g., 60 Hz, 120 Hz, or higher, or in a device for displaying 3D stereoscopic images. The phosphor represented by Formula 1 may have a decay time of about 5 ms or less. Preferably, the phosphor represented by Formula 1 has a decay time of about 1 ms or less. The phosphor composition including a first phosphor represented by Formula 1 may have a decay time of about 5 ms or less. Preferably, the decay time is about 4 ms or less. More preferably, the decay time is about 2 ms or less. Therefore, the phosphor composition may be used in a device for displaying a 3D stereoscopic image.

The phosphor represented by Formula 1 may have color coordinates CIE (x) of about 0.21 to about 0.41 and CIE (y) of about 0.50 to about 0.57, which may indicate an excellent green color coordinate characteristic. The phosphor composition including a first phosphor represented by Formula 1 and a second phosphor including at least one phosphor represented by Formulae 2 to 9 may have color coordinates CIE (x) of about 0.21 to about 0.37 and CIE (y) of about 0.50 to about 0.68.

Another embodiment provides a display device including the phosphor composition of an embodiment. The display device may have an excitation source of, e.g., VUV rays, and may include, e.g., a PDP. The phosphor composition according to an embodiment may be used in a display device that is capable of driving at a high speed of, e.g., 60 Hz, 120 Hz, or higher, or in a device for displaying a 3D stereoscopic image.

Hereinafter, a PDP is to be described as an example of the display device. FIG. 1 illustrates a partial exploded perspective view of a PDP according to an embodiment.

As shown in FIG. 1, the PDP may include a first substrate 1 (rear substrate) and a second substrate 11 (front substrate) disposed substantially in parallel with each other, with a predetermined distance therebetween.

On the surface of the first substrate 1, a plurality of address electrodes 3 may be disposed in one direction (the Y direction in the drawing), and a first dielectric layer 5 may be disposed covering the address electrodes 3. A plurality of barrier ribs 7 may be formed on the first dielectric layer 5 between the address electrodes 3 at a predetermined height to form a discharge space.

The barrier ribs 7 may be formed in any suitable shape as long as the barrier ribs 7 partition the discharge space. The barrier ribs 7 may have diverse patterns. For example, the barrier ribs 7 may be formed as an open-type, e.g., a stripe, or as a closed type, e.g., a waffle, a matrix, or a delta shape. Also, the closed-type barrier ribs may be formed such that a horizontal cross-section of the discharge space may be a polygon, e.g., a quadrangle, a triangle, or a pentagon, or a circle or an oval. Red (R), green (G), and blue (B) phosphor layers 9 may be disposed in discharge cells formed between the barrier ribs 7.

Display electrodes 13, each including a transparent electrode 13a and a bus electrode 13b, may be disposed in a direction crossing the address electrodes 3 (X direction in the drawing) on one surface of the second substrate 11 facing the first substrate 1. Also, a dielectric layer 15 may be disposed on the surface of the second substrate 11 while covering the display electrodes 13.

Discharge cells may be formed at positions where the address electrodes 3 of the first substrate 1 cross the display electrodes 13 of the second substrate 11. The discharge cells may be filled with a discharge gas.

With the above-described structure, address discharge may be achieved by applying an address voltage (Va) to a space between the address electrodes 3 and any one display electrode 13. When a sustain voltage (Vs) is applied to a space between a pair of display electrodes 13, an excitation source generated from the sustain discharge may excite a corresponding phosphor layer 9 to thereby emit visible light through the transparent second substrate 11. The excitation source may include VUV rays.

The following examples illustrate embodiments in more detail. The following examples are not more than specific examples, and the scope is not limited by the examples.

Example 1

Y$_2$O$_3$ was mixed with CeO$_2$, Al$_2$O$_3$, and Ga$_2$O$_3$ according to chemical equivalents. 100 g of the mixture was put in a 300 cc alumina crucible and fired at 1500° C. for 2.5 hours. 0.5 wt % of BaF$_2$ was added to the mixture as a flux, so that the mixture could have a particle size of less than 10 μm. The resulting mixture was ground and then cleaned, dried, and sieved, to prepare a Y$_{2.97}$Ce$_{0.03}$Al$_{4.5}$Ga$_{0.5}$O$_{12}$ phosphor with a particle diameter of less than 5 μm.

Example 2

A Y$_{2.97}$Ce$_{0.03}$Al$_{40}$Ga$_{1.0}$O$_{12}$ phosphor was prepared according to the same method as Example 1, except that the amounts of $Y_2O_3$, $CeO_2$, $Al_2O_3$, and $Ga_2O_3$ were changed according to chemical equivalents.

Example 3

A $Y_{2.97}Ce_{0.03}Al_{3.5}Ga_{1.5}O_{12}$ phosphor was prepared according to the same method as Example 1, except that the amounts of $Y_2O_3$, $CeO_2$, $Al_2O_3$, and $Ga_2O_3$ were changed according to chemical equivalents.

Example 4

A $Y_{2.97}Ce_{0.03}Al_{3.0}Ga_{2.0}O_{12}$ phosphor was prepared according to the same method as Example 1, except that the amounts of $Y_2O_3$, $CeO_2$, $Al_2O_3$, and $Ga_2O_3$ were changed according to chemical equivalents.

Example 5

A $Y_{2.97}Ce_{0.03}Al_{2.5}Ga_{2.5}O_{12}$ phosphor was prepared according to the same method as Example 1, except that the amounts of $Y_2O_3$, $CeO_2$, $Al_2O_3$, and $Ga_2O_3$ were changed according to chemical equivalents.

Comparative Example 1

$SiO_2$ was mixed with $MnCO_3$ according to chemical equivalents, and 10 wt % ZnO was added thereto. The resulting mixture was fired at 1300° C. for 2 hours under a 5% hydrogen-95% nitrogen atmosphere. Then, the mixture was ground, cleaned, dried, and sieved, to prepare a $Zn_{1.8}Mn_{0.2}SiO_4$ phosphor.

Comparative Example 2

$Y_2O_3$ was mixed with $Gd_2O_3$, $Al_2O_3$, and $Tb_4O_7$ according to chemical equivalents, and $B_2O_3$ was added as a flux at 110% of a stoichiometric ratio. Then, 100 g of the mixture was put in a 300 cc alumina crucible and fired at 1200° C. for 2 hours, under an oxygen atmosphere. The resulting mixture was ground, cleaned, dried, and sieved, to prepare a $(Y_{0.5}Gd_{0.5})_{0.75}Tb_{0.25}Al_3(BO_3)_4$ phosphor.

Comparative Example 3

$Y_2O_3$ was mixed with $CeO_2$ and $Al_2O_3$ according to chemical equivalents. Then, 100 g of the mixture was put in a 300 cc alumina crucible and fired at 1400° C. for 2.5 hours. 15 g of carbon was added to the resulting mixture to maintain a reduction atmosphere during the firing. 0.5 wt % of $BaF_2$ was then added as a flux, so that the mixture could have a particle size of less than 10 μm. The mixture was ground, cleaned, dried, and sieved, to prepare a $Y_{2.97}Ce_{0.03}Al_5O_{12}$ (x=0, y=0, k=0.03, a=5) phosphor with a particle diameter of less than 5 μm.

The phosphors of Examples 1 to 5 and Comparative Examples 1 to 3 were measured for their color coordinate (CIE x and y) and decay time. The results are shown in Table 1 of FIG. 3.

In general, an ideal green phosphor has a CIE color coordinate (x) of about 0.3 and (y) of about 0.6. The measurements were compared with these reference values. Referring to Table 1, "±0.2" represents a measurement error of the decay time.

As shown in Table 1, the green phosphors of Example 1 to 5 and Comparative Example 3 all had decay times of less than 1.0 ms. These decay times may be useful for a phosphor used in a PDP for displaying 3D stereoscopic images. However, the phosphors of Comparative Examples 1 to 2 had long decay times of 5.5±0.2 and 5.0±0.2 ms, respectively, and thereby may not be useful in a PDP for displaying 3D stereoscopic images.

The phosphors of Examples 1 to 5 and Comparative Example 3 were also measured for their relative luminance. The results are shown along with their color coordinates in Table 2. The relative luminance was calculated based on the relative luminance of the $Y_{2.97}Ce_{0.03}Al_5O_{12}$ phosphor of Comparative Example 3, which was considered to be 100%.

As shown in Table 2 of FIG. 4, the luminescence characteristics of the phosphors of Examples 1 to 5 were similar to the luminescence characteristics of the phosphor of Comparative Example 3. The phosphors of Examples 1 to 5 also exhibited much improved CIE (x), and a slightly deteriorated CIE (y), compared with the values of the phosphor of Comparative Example 3. Accordingly, the phosphors of Examples 1 to 5 may produce a much better green coordinate characteristic than that of Comparative Example 3.

The phosphors of Example 5 and Comparative Example 3 were examined for their fluorescent spectrum (excitation wavelength: 147 nm). The results are shown in FIG. 2.

Figure 2:
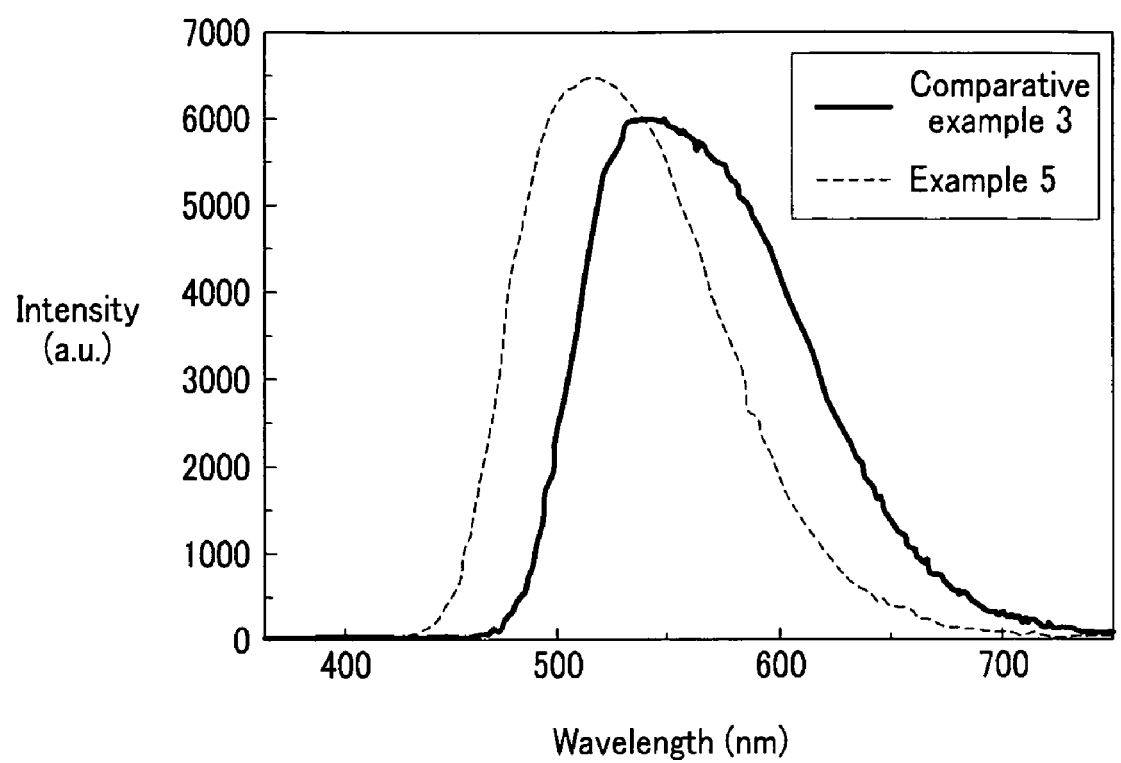
FIG. 2 illustrates graph of fluorescent spectra of phosphors according to Example 5 and Comparative Example 3.

As shown in FIG. 2, as Ga was increasingly substituted for Al, the peak wavelength of the phosphors shifted from about 540 nm to about 515 nm, and had stronger fluorescent intensity. This may result in an improved green color coordinate characteristic. In particular, the phosphor of Example 5 emitted most light at wavelengths of about 470 to about 580 nm, but became weak at above about 650 nm. Accordingly, the phosphor of Example 5 may be useful in a common PDP.

As for the phosphor represented by Formula 1, phosphors of Examples 6 to 8 and Comparative Example 4 were respectively prepared by changing the amount of Ce. They were then measured for their decay time, color coordinate, and relative luminance. This was to evaluate properties depending on the amount of Ce.

Example 6

A $Y_{2.98}Ce_{0.02}Al_{2.5}Ga_{2.5}O_{12}$ phosphor was prepared according to the same method as Example 1, except that the amounts of $Y_2O_3$, $CeO_2$, $Al_2O_3$, and $Ga_2O_3$ were changed according to chemical equivalents.

Example 7

A $Y_{2.94}Ce_{0.06}Al_{2.5}Ga_{2.5}O_{12}$ phosphor was prepared according to the same method as Example 1, except that the amounts of $Y_2O_3$, $CeO_2$, $Al_2O_3$, and $Ga_2O_3$ were changed according to chemical equivalents.

Example 8

A $Y_{2.92}Ce_{0.08}Al_{2.5}Ga_{2.5}O_{12}$ phosphor was prepared according to the same method as Example 1, except that the amounts of $Y_2O_3$, $CeO_2$, $Al_2O_3$, and $Ga_2O_3$ were changed according to chemical equivalents.

Comparative Example 4

A $Y_{2.90}Ce_{0.10}Al_{2.5}Ga_{2.5}O_{12}$ phosphor was prepared according to the same method as Example 1, except that the amounts of $Y_2O_3$, $CeO_2$, $Al_2O_3$, and $Ga_2O_3$ were changed according to chemical equivalents.

The phosphors of Examples 5 to 8 and Comparative Example 4 were measured for their color coordinate (CIE x and y), relative luminance, and decay time according to the same method described above. The results are shown in Table 3 of FIG. 6. The relative luminance was calculated based on of the luminance of the $Y_{2.97}Ce_{0.03}Al_5O_{12}$ phosphor of Comparative Example 3, which was considered to be 100%.

As shown in Table 3, the phosphors of Examples 5 to 8 had a decay time of less than about 1 ms. The phosphors of Examples 5 to 8 also exhibited more than about 90% of the luminance of the reference Comparative Example 3. This indicates that these phosphors may be useful in a PDP for displaying 3D stereoscopic images. The phosphor of Comparative Example 4 exhibited only 83% of the luminance of the reference Comparative Example 3. Maintaining the amount of Ce in the first phosphor represented by Formula 1 at about k=0.1 or less may help ensure that the green luminance does not decrease.

Phosphors of Comparative Example 5 and Examples 9 and 10 were examined for their decay time, color coordinate, and relative luminance. This was to evaluate properties of a mixture of phosphors prepared by mixing the first and second phosphors.

Comparative Example 5

A phosphor composition was prepared by mixing the $Y_{2.97}Ce_{0.03}Al_5O_{12}$ of Comparative Example 3 as a first phosphor R1, and $(Y_{0.5}Gd_{0.5})_{0.75}Tb_{0.25}Al_3(BO_3)_4$ of Comparative Example 2 as a second phosphor R2, in various ratios as shown in Table 4 of FIG. 6.

The phosphor compositions were measured for their decay time, color coordinate, and relative luminance. The results are shown in Table 4. The relative luminance was calculated based on the luminance of $Y_{2.97}Ce_{0.03}Al_5O_{12}$ of Comparative Example 3 as a single phosphor, which was considered to be 100%.

Example 9

A phosphor composition was prepared by mixing $Y_{2.97}Ce_{0.03}Al_3Ga_2O_{12}$ of Example 4 as a first phosphor R1 and $(Y_{0.5}Gd_{0.5})_{0.75}Tb_{0.25}Al_3(BO_3)_4$ of Comparative Example 2 as a second phosphor R2 in various ratios as shown in Table 5 of FIG. 7.

The phosphor compositions were measured for their decay time, color coordinate, and relative luminance. The results are shown in Table 5. The relative luminance was calculated based on the luminance of $Y_{2.97}Ce_{0.03}Al_3Ga_2O_{12}$ of Example 4 as a single phosphor, which was considered to be 100%.

Example 10

A phosphor composition was prepared by mixing $Y_{2.97}Ce_{0.03}Al_3Ga_2O_{12}$ of Example 4 as a first phosphor R1 and $Zn_{1.8}Mn_{0.2}SiO_4$ of Comparative Example 1 as a second phosphor R2 in various ratios as shown in Table 6 of FIG. 8. The phosphor compositions were measured for their decay time, color coordinate, and relative luminance. The results are shown in Table 6. The relative luminance was calculated based on the luminance of $Y_{2.97}Ce_{0.03}Al_3Ga_2O_{12}$ of Example 4 as a single phosphor, which was considered to be 100%.

Based on the results shown in Tables 4 to 6, when a phosphor was prepared by mixing the phosphor of Example 4, which has a short decay time, with $(Y,Gd)_{1-q}Tb_qAl_3(BO_3)_4$ or $Zn_{2-p}Mn_pSiO_4$, which exhibits excellent green luminescence characteristics, in an appropriate ratio, it was able to maintain its short decay time. This phosphor composition may therefore be useful in a device for displaying 3D stereoscopic images. Also, the phosphor composition exhibited excellent luminescence and color coordinate characteristics. In particular, compared with the results shown in Tables 4 and 5, the phosphor composition of Example 9 including $Y_{2.97}Ce_{0.03}Al_3Ga_2O_{12}$ of Example 4 as a first phosphor and $(Y_{0.5}Gd_{0.5})_{0.75}Tb_{0.25}Al_3(BO_3)_4$ as a second phosphor had a shorter decay time, and also exhibited a much better color coordinate characteristic than the phosphor composition of Comparative Example 5 including $Y_{2.97}Ce_{0.03}Al_5O_{12}$ as a first phosphor and $(Y_{0.5}Gd_{0.5})_{0.75}Tb_{0.25}Al_3(BO_3)_4$ as a second phosphor.

The phosphor and the phosphor compositions of Examples 1 to 10 of the embodiments may have excellent luminance, decay times, and color coordinate characteristic. They may therefore be superb choices for use as a phosphor in a PDP for displaying 3D stereoscopic images.

A green phosphor having a short decay time and good brightness may be useful for the next generation virtual three-dimensional stereoscopic multimedia, which may be applied to fields of, e.g., telecommunications, broadcasting, medical, education, training, military, games, animation, virtual reality, CAD, industrial technology, and so on.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A phosphor composition, comprising:
a first phosphor represented by Formula 1:

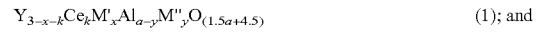
$$Y_{3-x-k}Ce_kM'_xAl_{a-y}M''_yO_{(1.5a+4.5)} \qquad (1); \text{ and}$$

a second phosphor including at least one phosphor represented by Formulae 2 to 9:

$$Zn_{2-p}Mn_pSiO_4 \qquad (2)$$

$$YBO_3{:}Tb \qquad (3)$$

$$(Y,Gd)_{1-q}Tb_qAl_3(BO_3)_4 \qquad (4)$$

$$BaMgAl_{10}O_{17}{:}Mn \qquad (5)$$

$$BaMgAl_{12}O_{19}{:}Mn \qquad (6)$$

$$Zn(Ga_{1-r}Al_r)_2O_4{:}Mn \qquad (7)$$

$$Li_2Zn(Ge,\theta)_yO_8{:}Mn \qquad (8)$$

$$(Y_{3-w}Ce_w)Al_5O_{12} \qquad (9)$$

wherein, M' includes at least one of Sc, In, and La, M'' includes at least one of Ga, Sc, and In, and x, y, a, and k satisfy the relations: $0.0 \leq x < 3.0$, $0.0 < y \leq 7.0$, $0.0 < k < 0.1$, $4.0 \leq a \leq 7.0$, $a - y \geq 0.0$, and $x + k \leq 3.0$,
p satisfies the relation: $0.01 \leq p \leq 0.60$,
q satisfies the relation: $0.01 \leq q \leq 0.50$,
r satisfies the relations: $0 \leq r \leq 1$,
θ includes Al or Ga, and v satisfies the relation: $3 \leq v \leq 4$, and
w satisfies the relation: $0 \leq w \leq 3$.

2. The phosphor composition as claimed in claim 1, wherein x, y, k, and a satisfy the relations: $0.0 \leq x \leq 1.0$, $1.0 \leq y \leq 3.0$, $0.01 < k < 0.05$, and $4.0 \leq a \leq 6.0$.

3. The phosphor composition as claimed in claim 1, wherein the first phosphor has a decay time of about 5.0 ms or less.

4. The phosphor composition as claimed in claim 3, wherein the first phosphor has a decay time of about 1 ms or less.

5. The phosphor composition as claimed in claim 1, wherein the first phosphor has a color coordinate of CIE (x) of about 0.21 to about 0.41 and CIE (y) of about 0.50 to about 0.57.

6. The phosphor composition as claimed in claim 1, wherein the first and second phosphors are included in a weight ratio of about 75:25 to about 10:90.

7. The phosphor composition as claimed in claim 6, wherein the first and second phosphors are included in a weight ratio of about 60:40 to about 20:80.

8. The phosphor composition as claimed in claim 1, wherein the phosphor composition has a color coordinate of CIE (x) of about 0.21 to about 0.37 and CIE (y) of about 0.50 to about 0.68.

9. A display device, comprising:

a display unit including a first phosphor represented by Formula 1:

$$Y_{3-x-k}Ce_kM'_xAl_{a-y}M''_yO_{(1.5a+4.5)} \quad (1); \text{ and}$$

a second phosphor including at least one phosphor represented by Formulae 2 to 9:

$$Zn_{2-p}Mn_pSiO_4 \quad (2)$$

$$YBO_3{:}Tb \quad (3)$$

$$(Y,Gd)_{1-q}Tb_qAl_3(BO_3)_4 \quad (4)$$

$$BaMgAl_{12}O_{17}{:}Mn \quad (5)$$

$$BaMgAl_{12}O_{19}{:}Mn \quad (6)$$

$$Zn(Ga_{1-r}Al_r)_2O_4{:}Mn \quad (7)$$

$$Li_2Zn(Ge,\theta)_vO_8{:}Mn \quad (8)$$

$$(Y_{3-w}Ce_w)Al_5O_{12} \quad (9),$$

wherein, M' includes at least one of Sc, In, and La, M'' includes at least one of Ga, Sc, and In, and x, y, k, and a satisfy the relations: $0.0 \leq x < 3.0$, $0.0 < y \leq 7.0$, $0.0 < k < 0.1$, $4.0 \leq a \leq 7.0$, $a-y \geq 0.0$, and $x+k \leq 3.0$, p satisfies the relation: $0.01 \leq p \leq 0.60$, q satisfies the relation: $0.01 \leq q \leq 0.50$, r satisfies the relations: $0 \leq r \leq 1$, θ includes Al or Ga, and v satisfies the relation: $3 \leq v \leq 4$, w satisfies the relation: $0 \leq w \leq 3$.

10. The display device as claimed in claim 9, wherein x, y, k, and a satisfy the relations: $0.0 \leq x \leq 1.0$, $1.0 \leq y \leq 3.0$, $0.01 < k < 0.05$, and $4.0 \leq a \leq 6.0$.

11. The display device as claimed in claim 9, wherein the first phosphor has a decay time of about 5.0 ms or less.

12. The display device as claimed in claim 11, wherein the first phosphor has a decay time of about 1 ms or less.

13. The display device as claimed in claim 9, wherein the first phosphor has a color coordinate of CIE (x) of about 0.21 to about 0.41 and CIE (y) of about 0.50 to about 0.57.

14. The display device as claimed in claim 9, wherein the first and second phosphors are included in a weight ratio of about 75:25 to about 10:90.

15. The display device as claimed in claim 14, wherein the first and second phosphors are included in a weight ratio of about 60:40 to about 20:80.

16. The display device as claimed in claim 9, wherein the phosphor composition has a color coordinate of CIE (x) of about 0.21 to about 0.37 and CIE (y) of about 0.50 to about 0.68.

17. The display device as claimed in claim 9, wherein the display device includes a device for realizing a three-dimensional stereoscopic image.

18. The display device as claimed in claim 9, wherein the display device is driven at a rate of about 60 Hz or more.

19. A display device, comprising:

a display unit including a first phosphor represented by Formula 1:

$$Y_{3-x-k}Ce_kM'_xAl_{a-y}M''_yO_{(1.5a+4.5)} \quad (1),$$

wherein, M' includes at least one of Sc, In, and La, M'' includes at least one of Ga, Sc, and In, and x, y, k, and a satisfy the relations: $0.0 \leq x < 3.0$, $0.0 < y \leq 7.0$, $0.0 < k < 0.1$, $4.0 \leq a \leq 7.0$, $a-y \geq 0.0$, and $x+k \leq 3.0$ and the display device includes a device for realizing a three-dimensional stereoscopic image.

* * * * *